United States Patent

[11] 3,586,183

| [72] | Inventor | Walter M. Shaffer<br>Chesterland, Ohio |
|---|---|---|
| [21] | Appl. No. | 810,220 |
| [22] | Filed | Mar. 25, 1969 |
| [45] | Patented | June 22, 1971 |
| [73] | Assignee | Towmotor Corporation<br>Cleveland, Ohio |

[54] CONTAINER HANDLING VEHICLE
8 Claims, 6 Drawing Figs.

[52] U.S. Cl. .................................................. 214/75G,
214/660, 280/150 C, 214/621
[51] Int. Cl. ..................................................... B60p 1/54
[50] Field of Search ............................................ 214/78,
660, 621, 75H, 670—674, 104; 294/674, 81;
212/140, 75; 280/150.5

[56] References Cited
UNITED STATES PATENTS

| 1,368,289 | 2/1921 | Post | 212/11 |
|---|---|---|---|
| 2,439,085 | 4/1948 | Grzech | 212/145 |
| 2,773,614 | 12/1956 | Edwards | 214/671X |
| 2,812,868 | 11/1957 | Crile | 214/75 (H) |
| 2,996,206 | 8/1961 | McKee | 214/75 X |
| 3,052,365 | 9/1962 | Cameron | 214/75 (H) |
| 3,236,400 | 2/1966 | Turturro | 214/75 |
| 3,338,436 | 8/1967 | Shaw | 214/660 X |
| 3,467,263 | 9/1969 | Auzims | 214/15 |
| 3,499,563 | 3/1970 | Forry | 214/621 |

FOREIGN PATENTS

| 856,416 | 3/1940 | France | 214/38.40 |
|---|---|---|---|
| 1,026,794 | 4/1966 | Great Britain | 214/660 |

*Primary Examiner*—Gerald M. Forlenza
*Assistant Examiner*—Raymond B. Johnson
*Attorney*—Fryer, Tjensvold, Feix, Phillips and Lempio

ABSTRACT: A container handling vehicle which may utilize a lift truck chassis with (a) telescoping means allowing the container handling devices to move parallel to the longitudinal axis of the chassis, (b) channel means allowing the container handling devices to move vertically, and (c) channel and roller means for allowing the vertical channels to move in a transverse direction, relative to the longitudinal axis of the vehicle. An alternate embodiment replaces stability producing outriggers with sets of hydraulically actuatable wheels, mounted at right angles to the vehicle main propulsion wheels, which hydraulically actuatable wheels produce improved stability of the vehicle.

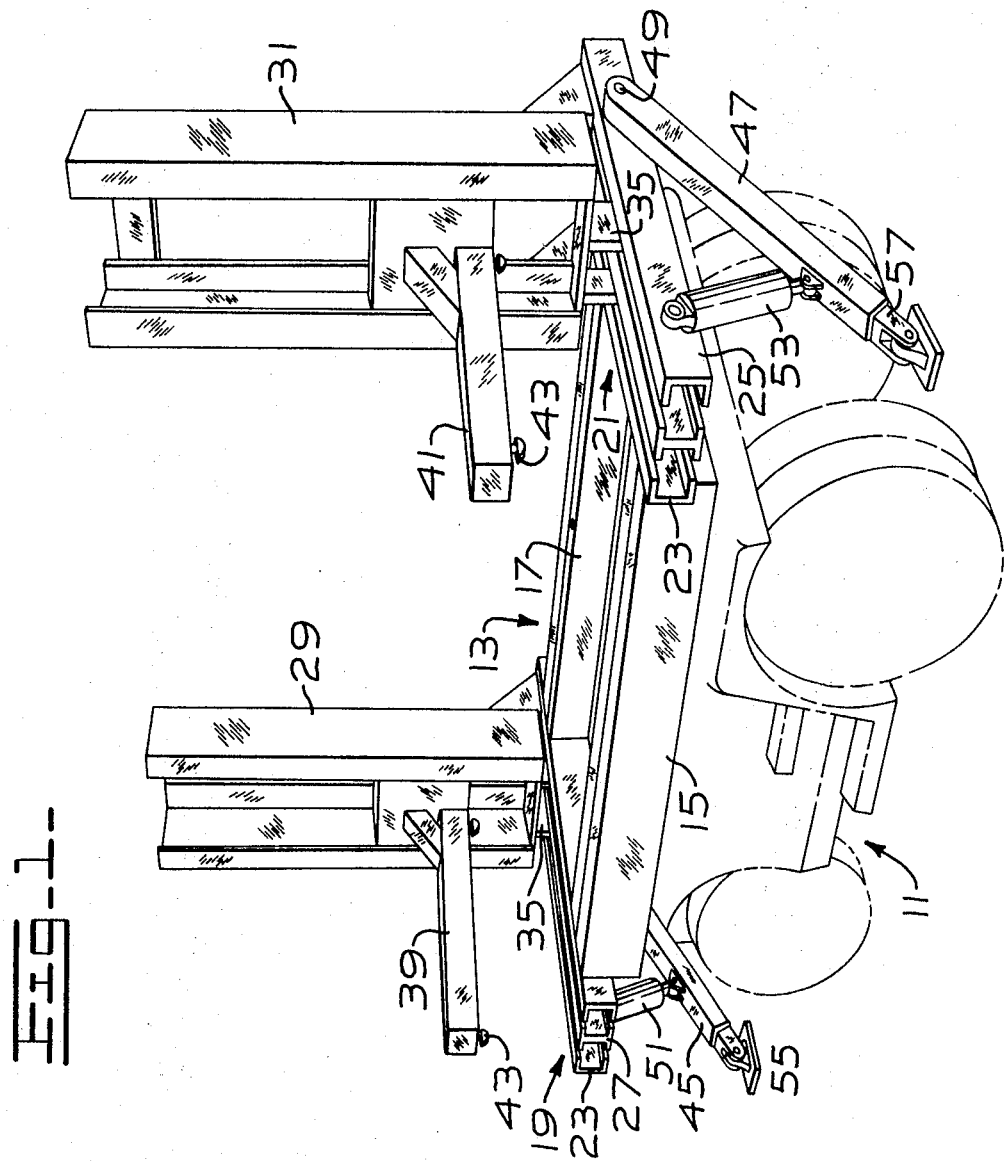

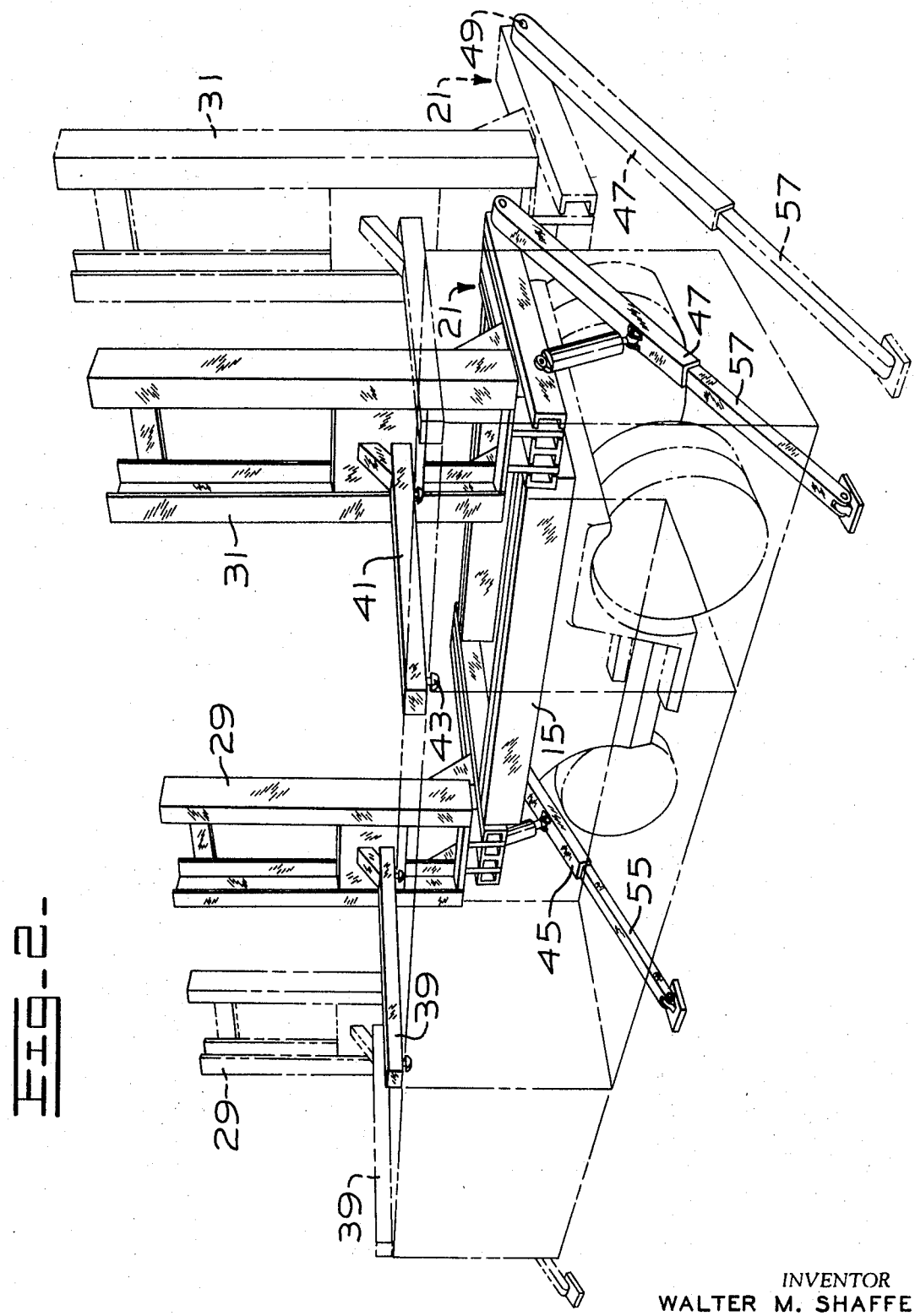

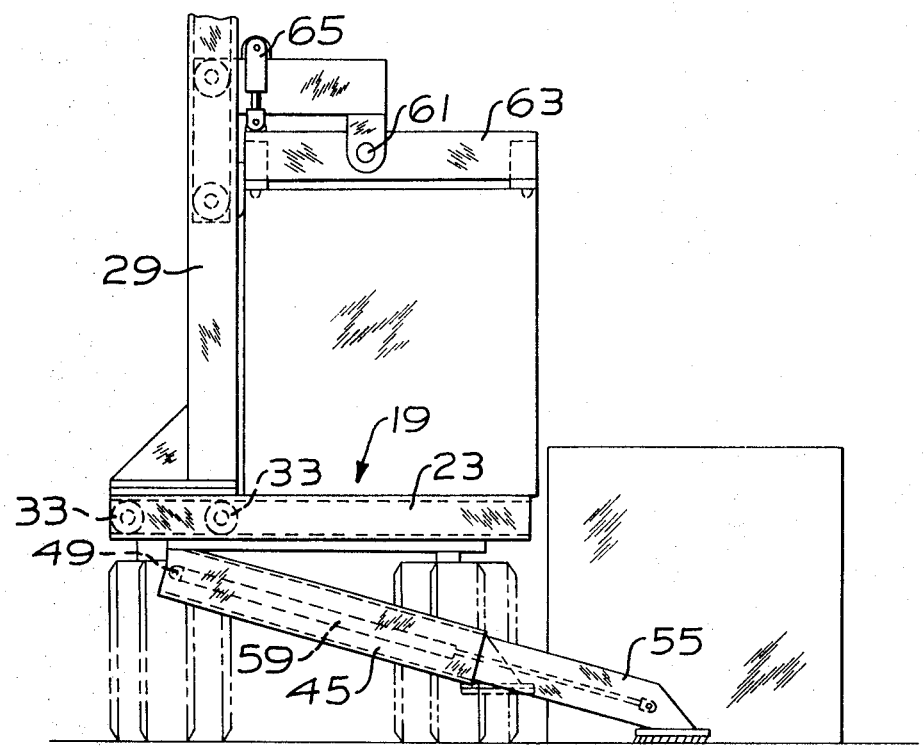

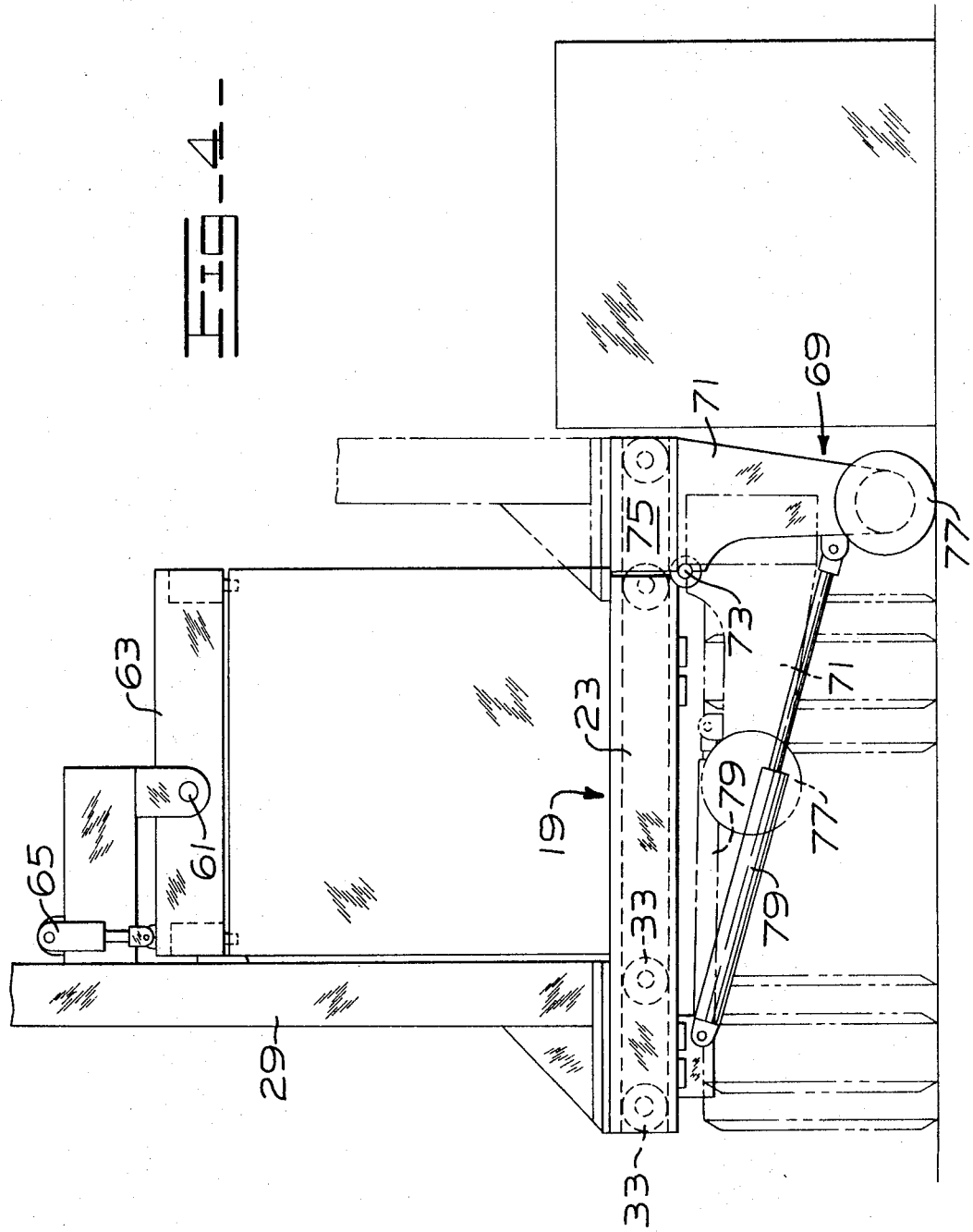

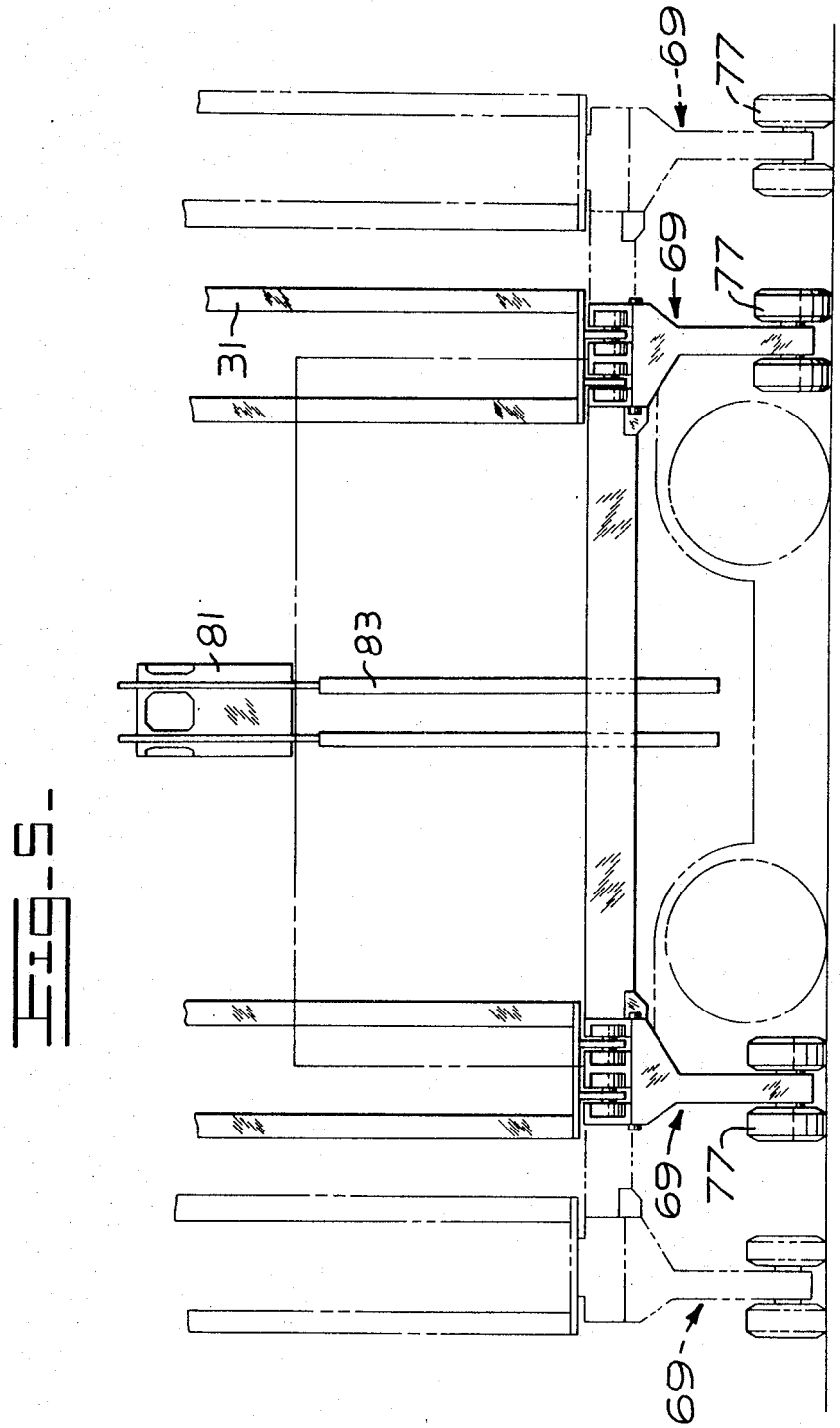

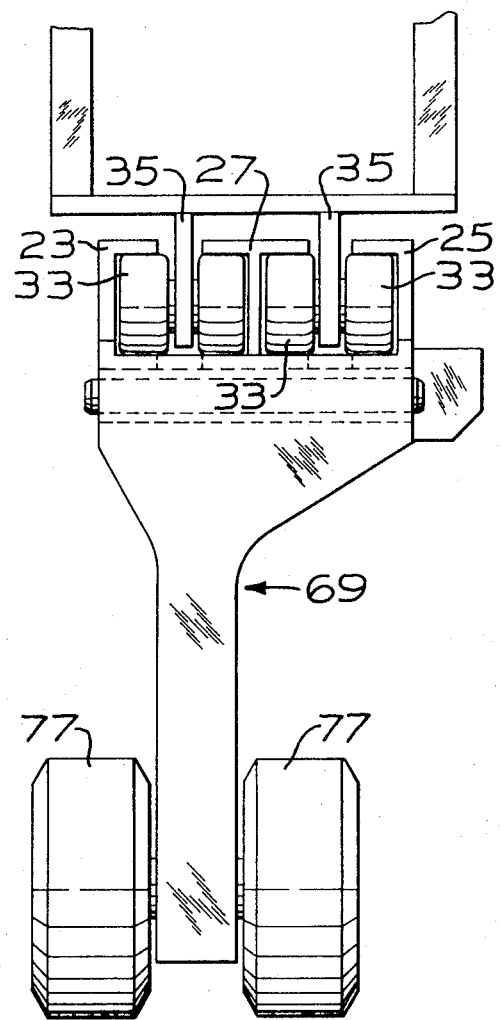

CONTAINER HANDLING VEHICLE

BACKGROUND AND SUMMARY OF THE INVENTION

This invention relates generally to a container handling vehicle. More particularly, it relates to a lift truck-type chassis which is provided with members capable of telescoping in the longitudinal direction to obtain adjustable load length while engaging standard corner fittings of 8 feet × 8 feet cross section containers, and for vertically and transversely moving such containers in handling and storage operations.

The relatively recent introduction of containers to the shipping industry has given rise to several problems in the handling and storage of such containers. An example of such a problem is that, while the containers normally have a standard 8 feet × 8 feet cross section, they may vary in length from 8 feet, or less, to 40 feet, or more.

Another problem which arose with such containers was the provision of suitable fittings whereby the containers could be lifted and fastened in place. In solving this problem, the International Organization for Standardization has recommended to the shipping industry that certain standard fittings be used on all such containers. In general, these recommendations appear to have been followed.

With the fitting problem apparently solved, the major problem with the use of containers then became one which is common with all warehousing and storage operations, whether or not a container is utilized. That problem is, of course, the maximum effective utilization of the storage space. In this regard, it has long been known that in any warehousing operation, aisles are considered to be "wasted space" since no material can be stored in them; the wider the aisle, the more space wasted. Additionally, in order to effectively utilize warehouse or storage space, the stored goods or containers should be stacked to as great a height as stability will allow.

Obviously, in the handling of materials such as containers, machinery must be utilized. Several machines are presently being produced for the handling of containers but all available machines embody disadvantages in realizing the maximum storage space capability. For example, straddle carriers generally cannot stack 20-foot containers more than two high or 40-foot containers more than one high, and maintain a reasonable degree of selectivity. Further, large, pneumatic-tired lift trucks can stack effectively but require such wide aisles or roadways that they are very inefficient in space usage; they can block stack from a wide aisle and load any flat bed vehicle from the side.

The invention described herein combines the advantages of such vehicles as are presently known, while eliminating the disadvantages which are inherent in each of them. The invention provides for high stacking while utilizing narrow aisles or roadways.

Broadly speaking, the invention comprises a large capacity, pneumatic-tired, lift truck-type vehicle upon which a special frame is mounted having structure thereon which allows the production of the desired results. Container handling arms, which may be adjusted relative to the vehicle's horizontal axis are mounted within channels for vertical movement, the vertical movement channels being mounted for lateral movement within tracks or similar structure, and the tracks being mounted for longitudinal movement on telescoping means within the frame.

Suitable devices can be provided to produce the required vehicle stability.

Therefore, it is an object of this invention to provide an improved container handling vehicle.

It is also an object hereof to provide a container handling vehicle which embodies all of the practical qualities of previously known vehicles, while eliminating the undesirable qualities thereof.

It is a still further object of this invention to provide a container handling vehicle which requires relatively narrow aisles for operation.

It is also an object hereof to provide such a container handling vehicle having good stability characteristics in all portions of the load handling operation.

It is also an object hereof to provide a container handling vehicle having excellent stability characteristics.

Other objects and advantages of the present invention will become apparent from the following description and claims as illustrated in the accompanying drawings which, by way of illustration, show a preferred embodiment of the present invention and principles thereof and what is now considered to be the best modes contemplated for applying these principles. It is recognized that other embodiments of the invention utilizing the same or equivalent principles may be used, and structural changes may be made as desired by those skilled in the art, without departing from the present invention and purview of the appended claims.

BRIEF DESCRIPTION OF THE DRAWINGS

FIG. 1 is an isometric projection of a machine embodying the basic concept of the present invention;

FIG. 2 is a similar view of the machine of FIG. 1 with the operative members illustrated in various positions which they may assume during operation;

FIG. 3 is an end view of the machine shown in FIGS. 1 and 2, but with a modification on the load carrying arms;

FIG. 4 is a view similar to FIG. 3, but having a further modification of the machine in the stabilizing means;

FIG. 5 is a side elevation of the machine illustrated in FIG. 4, with the parts thereof in various positions they may assume during operation of the machine; and FIG. 6 is a view of the stability pivot means of the embodiment shown in FIG. 4, together with the means utilized in all the modifications for moving the load carrying arms in a lateral direction relative to the vehicle chassis.

DETAILED DESCRIPTION OF THE DRAWINGS

Referring now to the drawings in greater detail, a lift truck chassis generally indicated at 11, and shown in phantom, has a fabricated frame assembly 13 mounted thereon by any suitable means (not shown).

The frame 13 generally comprises a pair of telescoping frame portions 15 and 17 on opposite sides of the vehicle and a set of channels or tracks 19 and 21 extending between the telescoping members.

As shown in FIG. 6 the tracks 19 and 21 generally comprise external channels 23 and 25 having an I-beam section 27 between the channels. A set of vertical masts 29 and 31 are situated at the ends of the vehicle so as to ride in the tracks on wheels 33 to which the masts are fastened, such as by brace members 35.

An identical pair of load handling arms 39 and 41 are mounted so as to extend perpendicularly from the masts 29 and 31, respectively.

The load handling arms may move vertically on the mast, the masts may move transversely within the channels, and the channels may be longitudinally separated or brought together by any suitable mechanisms, many of which are well known in the art.

A plurality of twist-lock latching means 43 are mounted on the underside of the arm for engaging and latching the standard casting corner fittings presently found on standardized containers.

The illustration of FIG. 2 is an isometric view of the machine, showing the vertical masts moved to the opposite side of the vehicle from that illustrated in FIG. 1, and also shows, in phantom, the channel in a position which may be assumed when the telescoping means are extended.

As shown in FIGS. 1—3, a pair of outriggers 45 and 47 are mounted on the tracks 19 and 21 respectively, by means of pins 49. The outriggers may be adjusted by hydraulic jacks 51 and 53 to the desired angle for proper support of the vehicle when inner extensible members 55 and 57 are actuated by internal jacks 59 in the upper part of the outrigger.

The outriggers counteract the force moment applied to the vehicle when the load center of gravity is beyond the edge of the vehicle frame 15.

In the embodiment shown in FIG. 3, an alternate version of the lifting arm is shown wherein a center pivot 61 and a load carrying arm 63 work in conjunction with a hydraulic cylinder means 65 to stabilize the container carried by the arm 63.

In the embodiment illustrated in FIGS. 4—6, wherein parts which are identical with the previously described embodiment are similarly labeled, the previously described outriggers have been replaced by a set of powered outrigger assemblies 69.

As shown in FIG. 4, each powered outrigger comprises a leg portion 71 which is fastened to frame 15 by a pin 73 and has a channel section 75 mounted on the upper portion thereof. The channel section is identical to the channel sections 19 and 21, and provides a track extension thereof so that the mast assembly 29 and 31 can be extended beyond the side 25, thereby extending the distance the load can be transported in that direction for block stacking.

A set of wheels 77 are rotatably mounted on the lower ends of arm member 71, and the arm, channel section, and wheels are pivoted about pin 73 by means of an extensible hydraulic jack 79.

When the jack is extended to put the arm in the position shown in FIG. 4, the vehicle fulcrum is effectively moved from the propulsion wheels on that side of the vehicle to the lowered position of the wheels 77, thereby producing a more effective use of the aisle width causing the vehicle to tilt very slightly, allowing the weight of the vehicle to be more effectively used in counterbalancing the moment exerted by the positioning of the load beyond the edges of frame 15.

When the cylinder 79 is actuated so as to retract the arm 71, the channel section 75 will also be pivoted out of the way so as to reduce the aisle-using width of the vehicle.

Of course, although only a few alterations and modifications have been illustrated and described, many other embodiments of the invention will readily be within the design capability of those skilled in the art without exceeding the purview of the following claims.

For example, when handling loads other than containers, the load handling arm may be replaced by forks which have long enough vertical sections for their horizontal portion to reach the ground surface in order to be inserted under loads as they are traversed laterally. Further, an operator's compartment 81 may be mounted on an elevating mechanism 83 so that he can see either over the top or underneath the bottom of the loads, at his choice.

I claim:

1. A load handling vehicle comprising a chassis, a frame mounted on the chassis, the frame comprising telescoping members extending longitudinally of the chassis and track members extending transversely of the chassis at the ends of the telescoping members, mast means mounted for transverse movement within the tracks, load handling arms mounted for vertical movement on the mast means, at least one outrigger means pivoted on the frame by means of pivot means, means on the outrigger means adapted to contact the surface upon which the vehicle is supported, said outrigger means being pivotable about a horizontal axis from an inoperative position substantially parallel to the vehicle frame to an operative position wherein said means on the outrigger means contacts the surface supporting the vehicle, track extension means mounted on said outrigger means and so located with respect thereto that said track extension means are brought into position in substantial alignment with the end of the track member when the outrigger means is extended to its operative position thereby providing an extension to the track member to enable the mast means to move beyond the end of the track member when picking up or setting down a load placed adjacent the vehicle, said outrigger means further being of a length and said pivot being so located whereby said means on said outrigger means acts as a vehicle fulcrum intermediate the vehicle and a load laterally adjacent the vehicle, and further including means for moving the outrigger means from and to its operative and inoperative positions.

2. The vehicle of claim 1 wherein said means on the outrigger means adapted to engage the surface upon which the vehicle is supported comprise wheel means mounted on the outrigger.

3. The vehicle of claim 1 wherein the pivot means is located adjacent the end of a track member whereby the outrigger means is located directly below the track member when in a normal inoperative position.

4. The vehicle of claim 1 wherein said outrigger means is pivotally attached about a horizontal axis adjacent an end of a track and is located below and substantially parallel to said track when in a normal inoperative position.

5. The vehicle of claim 1 further including means on the load handling arms for gripping containers within standard fixtures located therein.

6. The vehicle of claim 1 further including means extending from the mast means to pivotally support the load handling arms, and stabilizing means extending between said load handling arms and said means extending from the mast means to stabilize the load carried by the arms.

7. The vehicle of claim 6 wherein the stabilizing means comprise hydraulic cylinder means pivotally connected between the members between which it extends.

8. A load handling vehicle comprising a chassis, a frame mounted on the chassis, the frame comprising telescoping members extending longitudinally of the chassis and track members extending transversely of the chassis at the ends of the telescoping members, mast means mounted for transverse movement within the tracks, load handling arms mounted for vertical movement on the mast means, means extending from the mast means to pivotally support the load handling arms, stabilizing means extending between said load handling arms and said mast means to stabilize the load carried by the arms, means on said load handling arms for gripping a load, at least one outrigger means pivoted on the frame by means of pivot means, means on the outrigger means adapted to contact the vehicle supporting surface which the vehicle is supported, said outrigger means being pivotable about a horizontal axis from an inoperative position substantially parallel to and beneath the vehicle frame to an operative position wherein said means on the outrigger means contacts the vehicle supporting surface, and means to move said outrigger means between its operative and inoperative positions.